United States Patent [19]

Kertesz

[11] Patent Number: 5,443,098

[45] Date of Patent: Aug. 22, 1995

[54] THERMOPLASTIC PIPE NIPPLE

[75] Inventor: Janos Kertesz, Hofheim, Germany

[73] Assignee: Rasmussen GmbH, Maintal, Germany

[21] Appl. No.: 152,592

[22] Filed: Nov. 15, 1993

[30] Foreign Application Priority Data

Nov. 27, 1992 [DE] Germany ............... 42 39 909.2

[51] Int. Cl.⁶ .............................................. F16L 9/12
[52] U.S. Cl. ........................ 138/109; 138/DIG. 2; 138/DIG. 7; 138/DIG. 11; 285/414
[58] Field of Search .............. 138/109, 147, 148, 152, 138/163, DIG. 2, DIG. 7, DIG. 11; 285/10, 31, 149, 203, 235, 396, 414

[56] References Cited

U.S. PATENT DOCUMENTS

| | | | |
|---|---|---|---|
| 3,575,675 | 4/1971 | Hirsch et al. | 285/414 |
| 3,921,673 | 11/1975 | Pero | 138/109 |
| 4,183,560 | 1/1980 | Wyss | 285/414 |
| 4,217,935 | 8/1980 | Grendelman et al. | 138/109 |
| 4,267,863 | 5/1981 | Burelle | 138/109 |
| 4,407,528 | 10/1983 | Anthony | 138/109 |
| 4,590,116 | 5/1986 | Joly | 138/148 |
| 4,768,563 | 9/1968 | Kogge et al. | 138/109 |
| 4,784,185 | 11/1988 | Friedrichs | 138/109 |
| 5,062,457 | 11/1991 | Timmons | 138/109 |
| 5,171,041 | 12/1992 | McMillan et al. | 138/109 |
| 5,297,585 | 3/1994 | Andou et al. | 138/109 |
| 5,305,799 | 4/1994 | Dal Palu | 138/109 |
| 5,379,805 | 1/1995 | Klemm et al. | 138/109 |

OTHER PUBLICATIONS

Römpp-Chemie-Lexikon, Bd. 3, 1990, (*English translation of pertinent portions included*).

Kunstoff-Taschenbuch, 1992, (*English translation of pertinent portions included*).

Kunstoffe 84, *Phasenvermittler verbinden unverträgliche Kunststoffe*, 1994, (*English translation of pertinent portions included*).

Primary Examiner—Timothy F. Simone
Assistant Examiner—James F. Hook
Attorney, Agent, or Firm—Darby & Darby

[57] ABSTRACT

The present invention is a thermoplastic pipe nipple for connecting a flexible fluid conduit to a tank, comprising a first elongated tubular portion with a first end for engaging the conduit, and a second end for engaging a second portion of the nipple. The second portion is attached to the tank. The first part preferably consists of a reinforced polyamide, and the second part preferably consists of a non-reinforced high density polyethylene. The first part has a lower tendency to deform under load than the second part.

8 Claims, 1 Drawing Sheet

THERMOPLASTIC PIPE NIPPLE

FIELD OF THE INVENTION

This invention relates in general to connectors for attaching a flexible conduit to a tank. More particularly, the present invention relates to connectors for automobile fuel tank applications. Even more specifically, the invention refers to a thermoplastic pipe-nipple for connecting a flexible fluid conduit to a thermoplastic tank.

BACKGROUND OF THE INVENTION

The plastic fuel containers used in the automobile industry often include injection-molded plastic pipe nipples, which, for example, can be used for connecting an exhaust hose at a feeder pipe or for connecting a fuel hose to a fuel tank. These pipe nipples are connected to an opening in the feeder pipe or tank by a simple rotary weld.

Conventional tanks and their associated nipples consist of compatible plastics, such as un-reinforced high-density-polyethylene (HDPE). These plastic materials are selected primarily to provide a more dense, particularly diffusion dense, welding connection, for reusability, and for environmental compatibility. In addition, the plastics selected for use in automobile fuel tank applications should have a certain flexibility, so the tank can withstand a minimum load which may be applied in the event of an accident.

Conventional materials utilized in automobile fuel tank applications, especially un-reinforced HDPE, tend to soften or melt, or "creep", when subjected to higher local pressure loads, even at room temperature. If a flexible fluid-conduit, such as an elastomer-hose or a flexible plastic pipe, is connected with a plug-in or clamp-coupling which exerts high pressure locally on the pipe-nipple, even over a sealing O-ring, there is the danger that the connection between the pipe-coupling and the pipe-nipple will leak in time as a result of the pipe-nipple material's tendency to creep.

German application DE 3621948 A1 proposes to prevent creep in a thermoplastic pipe nipple on a plastic fuel tank by press-fitting a metal stiffening sleeve over the outside of the nipple. Attachment of a metal stiffener increases resistance to creep when high local pressure loads are applied, but does not provide a sufficiently permanent connection which will withstand the extreme vibration and temperature variations encountered in automotive applications.

SUMMARY OF THE INVENTION

An object of the present invention is to provide a thermoplastic pipe-nipple for the connection of a flexible conduit to a tank.

Another object of the present invention is to provide a thermoplastic pipe nipple which is compatible with conventional thermoplastic tanks and hoses for achieving a strong bond.

Still another object of the present invention is to provide a thermoplastic pipe nipple which may be welded to a conventional thermoplastic tank or hose to form a leak-proof seal.

Yet another object of the present invention is to provide a thermoplastic pipe nipple which can withstand high pressure loads without noticeable tendency to creep.

The present invention is a thermoplastic pipe nipple for connecting a flexible fluid conduit to a tank, comprising a first elongated tubular portion with a first end for engaging the conduit, and a second end for engaging a second portion of the nipple. The second portion is attached to the tank. The first part preferably consists of a reinforced polyamide, and the second part preferably consists of a non-reinforced high density polyethylene. The first part has a lower tendency to deform under clamping pressure ("creep") than the second part.

The pipe nipple of the present invention is made in two parts. The flexible conduit or hose may be attached to a first end of a first elongated tubular portion of the pipe nipple. The second portion of the pipe nipple, which is attached to a second end of the first portion during the injection molding process, is attached to a tank, preferably a thermoplastic fuel tank. Each portion of the nipple is molded from a different thermoplastic material, and as a result each portion exhibits unique properties. In particular, the first portion has a lesser tendency to creep than the second portion.

The first end of the first portion of the pipe nipple of the present invention is engaged with a fluid conduit with a coupling, particularly an easily attachable coupling with a seal, preferably an O-ring seal. This will provide a connection which will be tight and leak-proof, even with a high clamping-pressure, and will minimize leakage in the connection between the fluid-conduit and the first part of the pipe-nipple. The thermoplastic material of the first part of the pipe nipple of the present invention is selected to reduce creep as much as possible.

Preferably the first part consists of a reinforced plastic, most preferably a polyamide. This provides a first part with a very high mechanical and thermal strength, and which exhibits a very small tendency to creep during higher local pressure-load. The thermoplastic material making up the first portion may optionally be reinforced with a filler material such as fiberglass.

The second part of the pipe nipple of the present invention is affixed to the tank. The material for the second part of the pipe nipple of the present invention is selected for compatibility with the tank material. For example, the material of the second part of the pipe nipple may be easily joined to the tank by rotation welding. The creep tendency of the second part may be substantially higher than that of the material of the first part. Preferably, the second part is made from non reinforced plastic, most preferably HDPE.

The first and second parts may be connected by injection molding a part, the second part for instance, with the material of the other part. If one portion is injected while the other part remains in a hot and still liquid state, both parts will melt and fuse.

If different incompatible plastic materials are used for both parts, the plastic for one of the two parts can be adhesion-modified, so that through the heat created during injection molding a strong bond with other part occurs. To achieve the highest tensile strength for the connection of both parts, the contact surfaces of both parts should preferably be profiled.

BRIEF DESCRIPTION OF THE DRAWINGS

The invention and its further development are described as follows and illustrated by drawings of preferred embodiments.

DESCRIPTION OF THE PREFERRED EMBODIMENT

Figure 1:
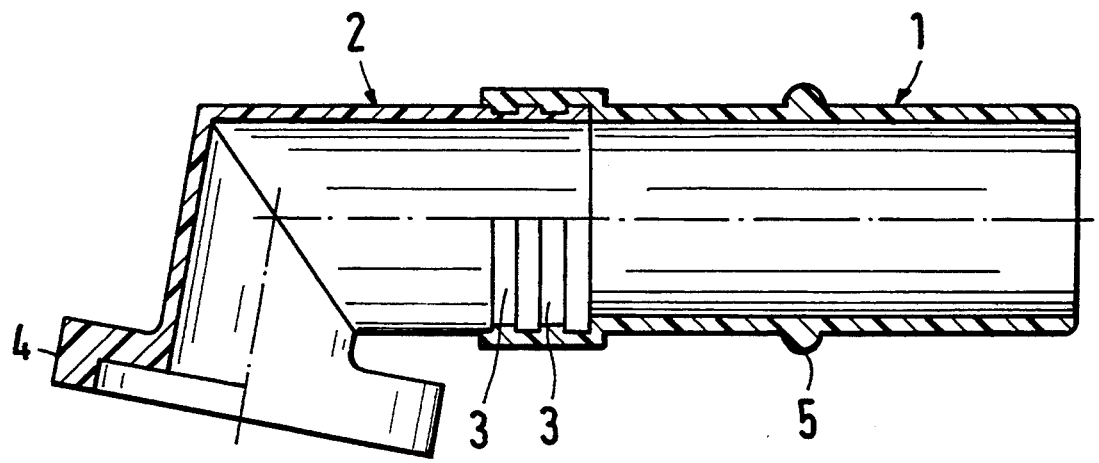
FIG. 1 a side-view of a first example of an application of a pipe-nipple per the invention, partially shown in cross-section.

The pipe-nipple shown in FIG. 1 is an elongated tube-like structure consisting of a first portion 1 and a second part 2.

The first portion is made of a thermoplastic with low tendency to deform under load. The thermoplastic selected for the first portion may vary widely depending on the intended application. Preferably, the material utilized for the first portion is a polyamide, such nylon 6, nylon 6,6, nylon 6,4, nylon 11, nylon 12, and mixtures thereof.

The material utilized for the first portion is preferably reinforced with a filler material, such as fiberglass. The use of fiberglass filler is particularly preferred when the first portion is made of nylon 11 and nylon 12.

The second part 2 of the pipe nipple of the present invention is made of a thermoplastic material which may exhibit a higher tendency to deform than the material making up the first portion. The thermoplastic material selected for the second part may vary widely depending on the intended application, but is selected for compatibility with the thermoplastic making up the tank. The preferred material for the second part is an HDPE.

The thermoplastic making up the second part may also be reinforced with filler materials, but it is preferred that no reinforcing materials be added.

If the thermoplastics making up the first portion and the second portion are not sufficiently compatible to provide a secure seal, the plastic of at least the first part 1 may be adhesion modified to enhance bonding with the second part.

Part 2 can be manufactured by any conventional technique, such as injection-molding or extrusion and corrugation. The end of the second part which is connected to part 1 is preferably profiled by circular grooves 3. Typically, the part or portion 1 will be formed by injection molding and the material of the part 1 around the profiled end of part 2 [will simultaneously be injected]. The profiled end of part 2 will melt on its outer surface, caused by the heat of the still liquid material of part 1, so that the material of part 1 since it is adhesion modified, creates a strong bond with the material of part 2. At the same time the end of the inner surface of part 1, which is connected to part 2 will be profiled matching the outside of part 2, resulting in a connection which has not only homogenous material but is also form-locking.

Part 2 may have a flange 4 on its free end, which may be connected to a lateral opening of a feeder-pipe of an automobile fuel-tank by rotational welding.

On the outer surface of part 1 is a retaining rib 5. A flexible plastic pipe, such as an elastomer ventilation-hose, can slide onto this end of the nipple and be retained. Later a hose clip may be fastened at the end of the ventilation-hose between the connecting portion of both parts 1 and 2 and the retaining-rib 5. Even with high clamping pressure there is no danger that the material of part 1 deforms at the location of the clamping pressure due to its low tendency to creep.

Alternatively, a quick-connecting coupling, such as a plug-in-coupling, may be used. Such a coupling could consist of a sleeve, which is inserted in part 1, wherein the outer surface of part 1 has hook-like holding-arms, which reach up behind the retaining-rib 5. The connected hose will be tightly connected with the sleeve and is provided with an O-ring seal between the sleeve and the part 1. Due to the low tendency of the material of part 1 to creep, there is no danger for the material of part 1 to deform under the pressure of the O-ring seal.

Figure 2:
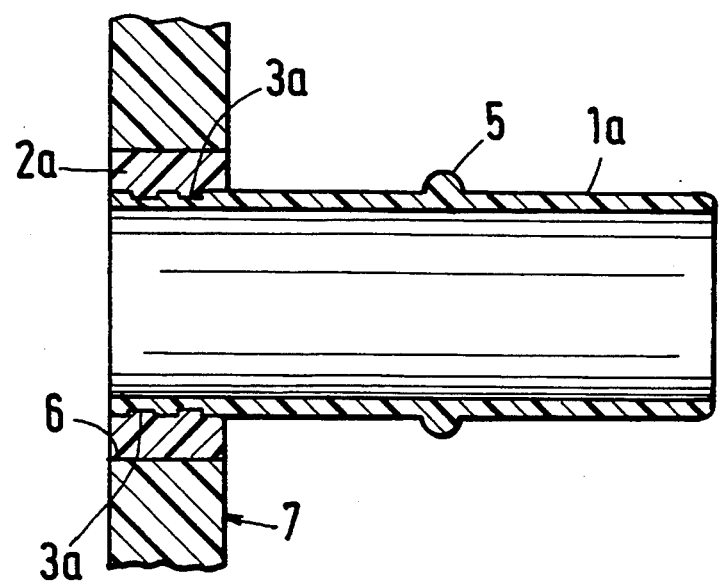
FIG. 2 an axial cross-section through a second example of an application of a pipe-nipple per the invention and a part of a wall of a tank, into whose opening the pipe-nipple is welded by rotation-welding.

With the example of the application shown in FIG. 2, both parts 1a and 2a of the pipe-nipple consist of the same material as the parts 1 and 2 of the pipe-nipple in FIG. 1. In FIG. 2 part 2a is injected around part 1a and part 1a is produced with a profile on the end portion, which is to be connected to part 2a. This means that this part is provided with circular grooves 3a. Part 2a is welded into an opening 6 of the tank 7, which is made from a compatible thermoplastic material such as HDPE.

The embodiments of the present invention can be varied in many ways. For example, in place of the material of part 1, 1a, the material of part 2, 2a, can be adhesion-modified.

If the materials of part 2, 2a are not compatible with the material of the machine with which the pipe-nipple is to be connected by rotary welding, an additional part may be welded between part 2, 2a and the opening of the machine, where the pipe-nipple is to be welded. This new part would consist of a material which is compatible with the material of the machine as well as the material of parts 2, 2a.

While the invention has been described in detail and with reference to specific embodiments thereof, it will be apparent to one skilled in the art that various changes and modifications can be made therein without departing from the spirit and scope thereof.

What is claimed is:

1. A thermoplastic pipe nipple for connecting a flexible fluid conduit to a tank, comprising:
   a first elongated tubular portion;
   a second portion, said first elongated tubular portion having a first end for engaging said conduit, and a second end for engaging and surrounding said second portion, said second end of said first portion and said second portion being fused together in an area of their contact surfaces, said second portion being adapted to be attached to the tank, wherein the first portion of said nipple consists of a reinforced polyamide, and the second portion of said nipple consists of a non-reinforced plastic, and wherein said first portion has a lower tendency to deform under load than the second portion.

2. A pipe nipple as claimed in claim 1, wherein the first portion of said nipple is reinforced with a glass fiber filler material.

3. A pipe nipple as claimed in claim 1, wherein at least one of said first and second portions of said nipple are adhesion modified.

4. A pipe nipple as claimed in claim 1, wherein at least one of the second end of said first portion and said second portion of said nipple are profiled to form a form-locking connection.

5. A pipe nipple as claimed in claim 1, wherein said first end of said first portion of said nipple further comprises a retaining rib.

6. A device for attaching a flexible conduit to a thermoplastic tank, comprising a pipe nipple consisting of a first elongated tubular portion with a first end for engaging said conduit, and a second end for engaging a second portion of said nipple, said second portion being adapted to be attached to the tank, wherein the first portion consists of a fiberglass reinforced polyamide, and the second portion consists of a non-reinforced high density polyethylene, and wherein said first portion has a lower tendency to deform under application of clamping pressure than the second portion.

7. A device for attaching as claimed in claim 6, wherein said second portion of said nipple further comprises a flange for connection to said tank.

8. A device for attaching as claimed in claim 6, wherein at least one of said first and second portions are adhesion modified.

* * * * *